Patented June 16, 1936

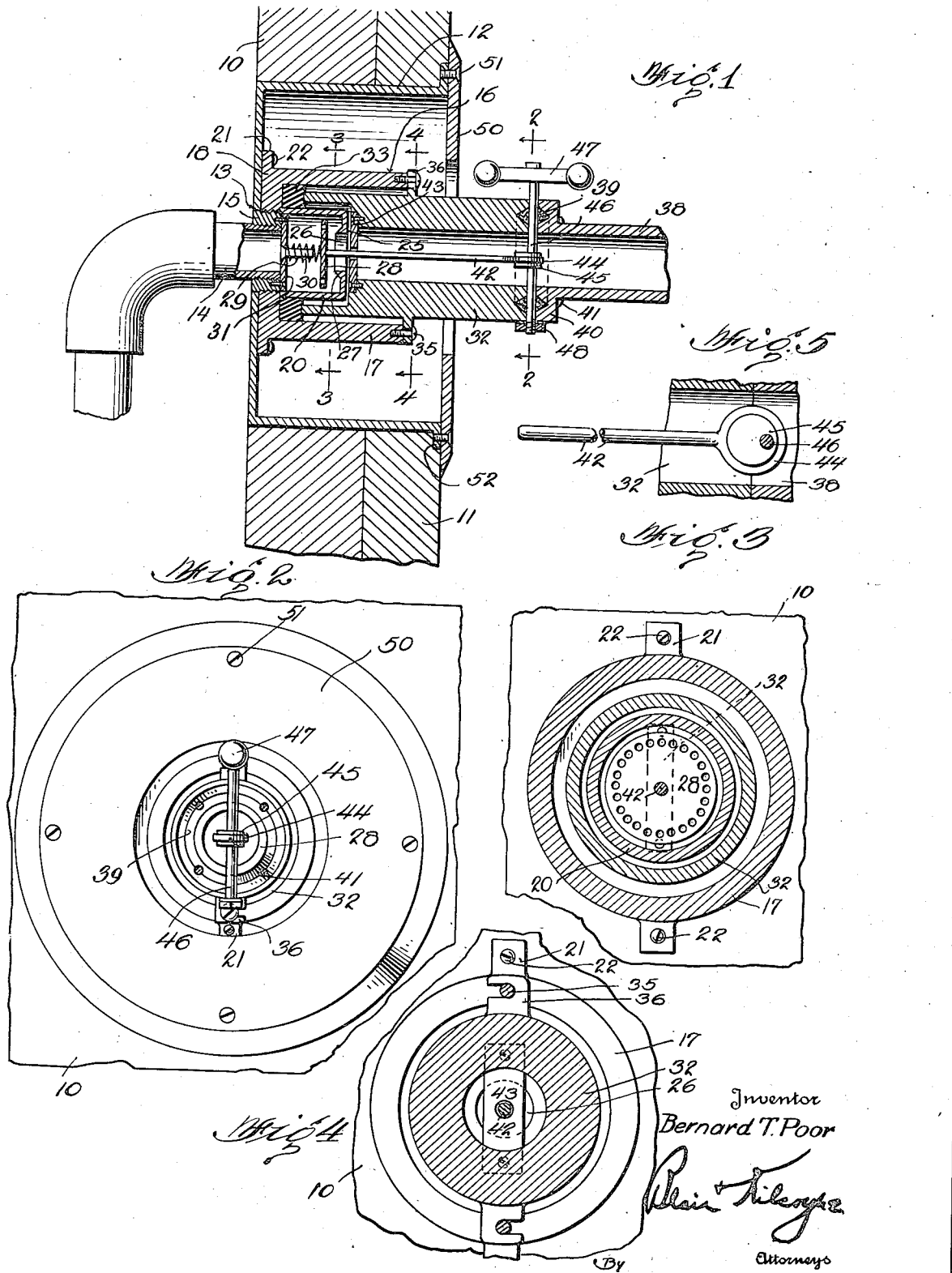

2,044,633

UNITED STATES PATENT OFFICE 2,044,633

WALL OUTLET

Bernard T. Poor, Fall River, Mass.

Application August 15, 1933, Serial No. 685,263
Renewed April 27, 1936

1 Claim. (Cl. 251—156)

This invention relates to improvements in wall outlets for fluid lines such as gas and water.

Among the objects of my invention is the provision of an improved wall outlet for fluid lines such as gas or water or the like; the provision of a wall outlet of the above character having safety features; the provision of a wall outlet for gas or water lines characterized by an improved connection between the wall pipe and the outlet line associated therewith; the provision of a wall outlet of the above described character which is so designed and operable as to shut off the flow of the fluid upon the outlet line being accidentally disconnected from the wall pipe; the provision of an outlet box for fluid lines incorporating a valve connection between the wall pipe and outlet line, with the valve being readily operable, and so arranged that it may be operated exteriorly of the wall.

Other objects will be in part obvious and in part hereinafter pointed out in connection with the accompanying drawing, in which—

Fig. 1 is a section through the wall outlet, with the valve shown in open position;

Fig. 2 is an elevation with certain parts broken away;

Fig. 3 is a section along line 3—3 of Fig. 1;

Fig. 4 is a section along line 4—4 of Fig. 1; and

Fig. 5 is a detail of the valve operating stem.

In the drawing, the reference character 10 indicates generally the wall of a room or the like having a base board 11. The wall and base board are recessed to receive an outlet box 12 which may be circular as illustrated, having its bottom or rear wall apertured as at 13. A wall pipe 14 supplying water, gas or other fluid extends through aperture 13 within box 12, its end being threaded to receive an interiorly and exteriorly threaded adapter nipple 15. A fitting generally designated at 16 and consisting of an outer circular wall 17, and end wall 18, and an inner circular wall 20, the latter being hereinafter referred to as a cage, is adapted for connection with the end of supply pipe 14, the end wall 18 being apertured and threaded to screw on to adapter nipple 15. The fitting 16 is provided with ears 21 through which extend screws 22 whereby the fitting may also be secured to the wall box 12.

The cylindrical cage 20, being open at one end, is in communication with supply pipe 14. The other end 25 of said cage 20 is constituted by a plate or flange apertured as at 26 to provide an outlet therethrough. Said outlet 26 is defined by a circular upstanding lip 27 forming a seat for a valve disc 28, the said disc being normally pressed into seating engagement with seat 27 by a spring 29 disposed about a stud or pin 30 on a strap (or spider) 31 extending diametrically across the open mouth of pipe 14 and preferably riveted or otherwise secured to adapter nipple 15.

By reference to Fig. 1, it will be seen that circular wall 17 is of substantially greater depth than the depth of cage 20 and extends well forwardly into outlet box 12. Between the inner wall of the cylindrical portion 17 of the fitting and the outer wall of the cage, there is thus formed an annular space into which extends the reduced end of a plug 32, the said plug being interiorly bored, with the bore extending in axial alignment with the end of supply pipe 14 and cage 20. The end of plug 32 seats against a packing ring 33 of rubber or the like, with the plug being held in such seating relation by means of screws 35 threaded into the end of the cylindrical wall 17 of the fitting 16, under which screws extend slotted ears 36 projecting radially from the plug 32 at substantially its mid portion. By adjusting screws 35, plug 32 may be moved in a left-hand direction, Fig. 1, to seat tightly against ring or gland 33 to thus prevent leakage of the fluid past the joint so formed.

Associated with plug 32 is an outlet hose 38 which in the construction illustrated is provided with end flange 40 abutting the end of plug 32, the hose being secured to the seat plug by screws 41 or equivalent securing means, with a packing ring 39 seating in mating grooves formed in plug 32 and flange 40, respectively, thereby to prevent leakage.

As hereinbefore stated, valve 28 is held normally seated against circular lip 27 by action of spring 29. In order to actuate the valve 28 out of such seating relation and thereby establish communication between supply pipe 14 and outlet line 32, 38, I provide means for positively actuating said valve 28 away from its seat 27, such means being preferably carried bodily by plug 32. Said means may comprise an actuable stem 42 arranged axially in plug 32 and centered therein by a strap (or spider) 43 provided with an aperture through which stem 42 passes. Stem 42 at its outer end carries a circular strap 44 disposed over an eccentric 45 on a shaft 46, the said shaft extending through the joint between plug 32 and flange 40, and being provided at one end with an operating handle 47 and at its other end with a securing nut 48. Cam 45 is so related to stem 42 that a half revolution of shaft 46 causes stem 42 to be projected to the left, Fig. 1, The end of stem 42 is adapted to bear against disc 28 and during such leftwise movement, stem 42 unseats valve 28 against action of spring 29, the valve being maintained unseated so long as shaft 46, through its handle 47, is so turned.

Operation of handle 47 throughout a half revolution in the opposite direction causes stem 42 to be actuated in the reverse direction, permitting valve 28 to again seat.

In the construction illustrated, it is intended that the connection between plug 32 and fitting 16 be detachable. Thus connection between said parts is made by inserting the plug in the annular space between circular wall 17 and cage 20 of the fitting 16 and thereafter turning the fitting to thread ears 36 under the heads of screws 35. It will be understood that other forms of detachable connections between the outlet line, as represented by plug 32, and the fitting 16 may be substituted.

A salient feature of the present invention resides in the fact that valve 28 is normally closed by action of spring 29, thus to interrupt communication between supply pipe 14 and outlet line 32, 38 until handle 47 has been positively actuated. If plug 32 accidentally becomes disconnected from fitting 16, valve 28 will automatically close, due to action of spring 29 pushing stem 42 and consequently fitting 32 to the right. Further, handle 47 is disposed exteriorly of outlet box 12, thus making the handle readily accessible for actuation and overcoming the disadvantages of conventional constructions in which the valve handle was enclosed within an outlet box and requiring that the hand be inserted through the relatively small opening in the box to operate the valve.

Although, in the construction illustrated, plug 32 is made separate from outlet hose 38, it will be understood that the plug may be formed integrally on the hose, and that different forms of connection between the plug and hose, when made separate, may be substituted.

The open front of wall box 12 may be substantially closed by a plate 50 secured as by screws 51 to a flange 52 formed around the open mouth of the box, with the closure plate being suitably apertured to provide for entrance of the plug 32 for connection with the fitting 16.

Without further analysis, the foregoing will so fully reveal the gist of this invention that others can by applying current knowledge readily adapt it for various applications without omitting certain features that from the standpoint of the prior art fairly constitute essential characteristics of the generic or specific aspects of this invention, and therefore such adaptations should and are intended to be comprehended within the meaning and range of equivalency of the following claim.

I claim:

The combination of a supply pipe, a fitting operatively attached thereto, the fitting including inner and outer cylindrical walls providing an annular space and an end wall extending between said cylindrical walls, a packing ring disposed in said space and located against said end wall, the inner cylindrical wall constituting a valve cage communicating at one end with the pipe and having at its other end an inwardly extending flange forming a valve seat, a valve in said cage, means normally urging said valve against said seat, and a longitudinally bored connecting plug having one end adapted for connection to an outlet line and the other end extending into the annular space between said cylindrical walls, means disposed intermediate the ends of said plug and at the end of the outer cylindrical wall, respectively, for detachably securing the plug to the fitting in such manner that said other end of the plug extends into said annular space a sufficient distance as to seat in leak-tight relation against the packing ring, and means carried by said plug for unseating the valve.

BERNARD T. POOR.